United States Patent
Moonen et al.

(10) Patent No.: US 10,218,413 B2
(45) Date of Patent: Feb. 26, 2019

(54) DEVICE DETECTION USING HARMONICS

(71) Applicant: NXP B.V., Eindhoven (NL)

(72) Inventors: Oswald Moonen, Eindhoven (NL); Klaas Brink, Waalre (NL); Patrick Andre Yves Ozenne, Benouville (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/665,199

(22) Filed: Jul. 31, 2017

(65) Prior Publication Data

US 2018/0041253 A1  Feb. 8, 2018

(30) Foreign Application Priority Data

Aug. 2, 2016  (EP) .................................... 16306001

(51) Int. Cl.
| | |
|---|---|
| *H04B 5/00* | (2006.01) |
| *H04B 1/38* | (2015.01) |
| *H02J 50/80* | (2016.01) |
| *H02J 50/20* | (2016.01) |
| *H02J 50/70* | (2016.01) |
| *H02J 5/00* | (2016.01) |
| *G01V 3/10* | (2006.01) |
| *H02J 50/12* | (2016.01) |
| *H02J 50/60* | (2016.01) |
| *G01V 15/00* | (2006.01) |

(52) U.S. Cl.
CPC ............. *H04B 5/0037* (2013.01); *G01V 3/10* (2013.01); *G01V 15/00* (2013.01); *H02J 5/005* (2013.01); *H02J 50/12* (2016.02); *H02J 50/20* (2016.02); *H02J 50/60* (2016.02); *H02J 50/70* (2016.02); *H02J 50/80* (2016.02); *H04B 5/0043* (2013.01)

(58) Field of Classification Search
CPC .... H04W 4/008; H04W 52/0225; H04B 5/00; H04B 5/02; H04B 5/0037; H04B 5/0062; H04B 5/0081; H04B 7/26; H04M 1/6066; H04M 2250/04
USPC .......... 455/41.1, 41.2, 41.3, 556.1, 574, 573
See application file for complete search history.

(56) References Cited

U.S. PATENT DOCUMENTS

| | | | |
|---|---|---|---|
| 8,946,939 B2* | 2/2015 | Drennen | H02J 7/025 307/104 |
| 8,971,802 B2* | 3/2015 | Jones | H04B 5/0056 455/41.1 |
| 9,088,168 B2* | 7/2015 | Mach | H02J 5/005 |
| 9,787,366 B1* | 10/2017 | Shirani-Mehr | H02J 50/90 |
| 9,853,697 B2* | 12/2017 | Kim | H04B 5/02 |
| 2012/0248891 A1 | 10/2012 | Drennen | |
| 2014/0176056 A1 | 6/2014 | Sedzin et al. | |
| 2014/0191710 A1 | 6/2014 | van Lammeren et al. | |
| 2015/0028875 A1 | 1/2015 | Irie et al. | |
| 2016/0187519 A1 | 6/2016 | Widmer et al. | |

* cited by examiner

*Primary Examiner* — Quochien B Vuong

(57) ABSTRACT

Wireless power is provided to a WPP-compliant wireless device by generating a first radio frequency (RF) signal at a first frequency. The transmitter circuit is inductively coupled to the compliant wireless device using the first RF signal. A second RF signal is generated at a second frequency. The presence of a WPP-noncompliant wireless device is detected by detecting a third RF signal at a third frequency that is a harmonic of the second frequency. The non-compliant wireless device is protected by reducing, in response to detecting the third RF signal, a signal strength for the first RF signal.

16 Claims, 7 Drawing Sheets

DEVICE DETECTION USING HARMONICS

CROSS-REFERENCE TO RELATED APPLICATIONS

This application claims the priority under 35 U.S.C. § 119 of European patent application no. 16306001.5, filed Aug. 2, 2016 the contents of which are incorporated by reference herein.

OVERVIEW

Aspects of various embodiments are directed to detection of devices within range of a circuit providing wireless power.

The near-field communication (NFC) technology can be used in a broad range of applications. For example, an NFC tag or reader can be integrated into a mobile device (e.g., smartphone or tablet). This might allow the mobile device to act as a card for ticketing or payment. This might also allow the mobile device to serve as a reader for NFC tags and provide additional functionality for various related applications. NFC technology can be useful with respect to the simplicity of use, especially for the end user. One element that supports the simplicity is the use of an automatic device discovery approach between a reader and a tag. For example, the NFC reader (or controller) can be switched between the different configurations, and have the capability to run the relevant application without interaction of the end user. One problem with automated detection, particularly when integrated in a mobile device, can be the associated power consumption of the detection process. The power consumption can negatively impact the phone stand by time.

These and other matters have presented challenges to efficiencies of wireless communication technology and implementations, for a variety of applications.

SUMMARY

Various example embodiments are directed to issues such as those addressed above and/or others which may become apparent from the following disclosure relating to the detection of devices within a wireless field.

In certain example embodiments, aspects of the present disclosure involve monitoring for a harmonic of a provided wireless field. The harmonic is then used to indicate the presence of a wireless device within the wireless field.

In various example embodiments, an apparatus includes a wireless-power-providing (WPP) circuit configured to provide wireless power to a WPP-compliant wireless device. The WPP circuit includes a transmitter circuit configured to: generate, in a wireless-power-providing mode, a first radio frequency (RF) signal at a first frequency, the first RF signal inductively coupling the transmitter circuit to the compliant wireless device; and generate a second RF signal at a second frequency. A detection circuit is configured to detect the presence of a WPP-noncompliant wireless device, the detection circuit includes: a receiver circuit configured to detect a third RF signal at a third frequency that is a harmonic of the second frequency. A control circuit is configured to: control, for the wireless-power-providing mode, the generation each of the first RF signal and the second RF signal by the transmitter circuit; and reduce, in response to detecting the third RF signal, a signal strength for the first RF signal.

Consistent with some embodiments of the present disclosure, a method includes: providing wireless power to a WPP-compliant wireless device. The wireless power is provided, in a wireless-power-providing mode, by: generating, using a transmitter circuit, a first RF signal at a first frequency; and inductively coupling the transmitter circuit to the compliant wireless device using the first RF signal. The method further includes: generating, using the transmitter circuit, a second RF signal at a second frequency; detecting, using a detection circuit, the presence of a WPP-noncompliant wireless device by detecting a third RF signal at a third frequency that is a harmonic of the second frequency; and protecting, using a control circuit, the non-compliant wireless device by reducing, in response to detecting the third RF signal, a signal strength for the first RF signal.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
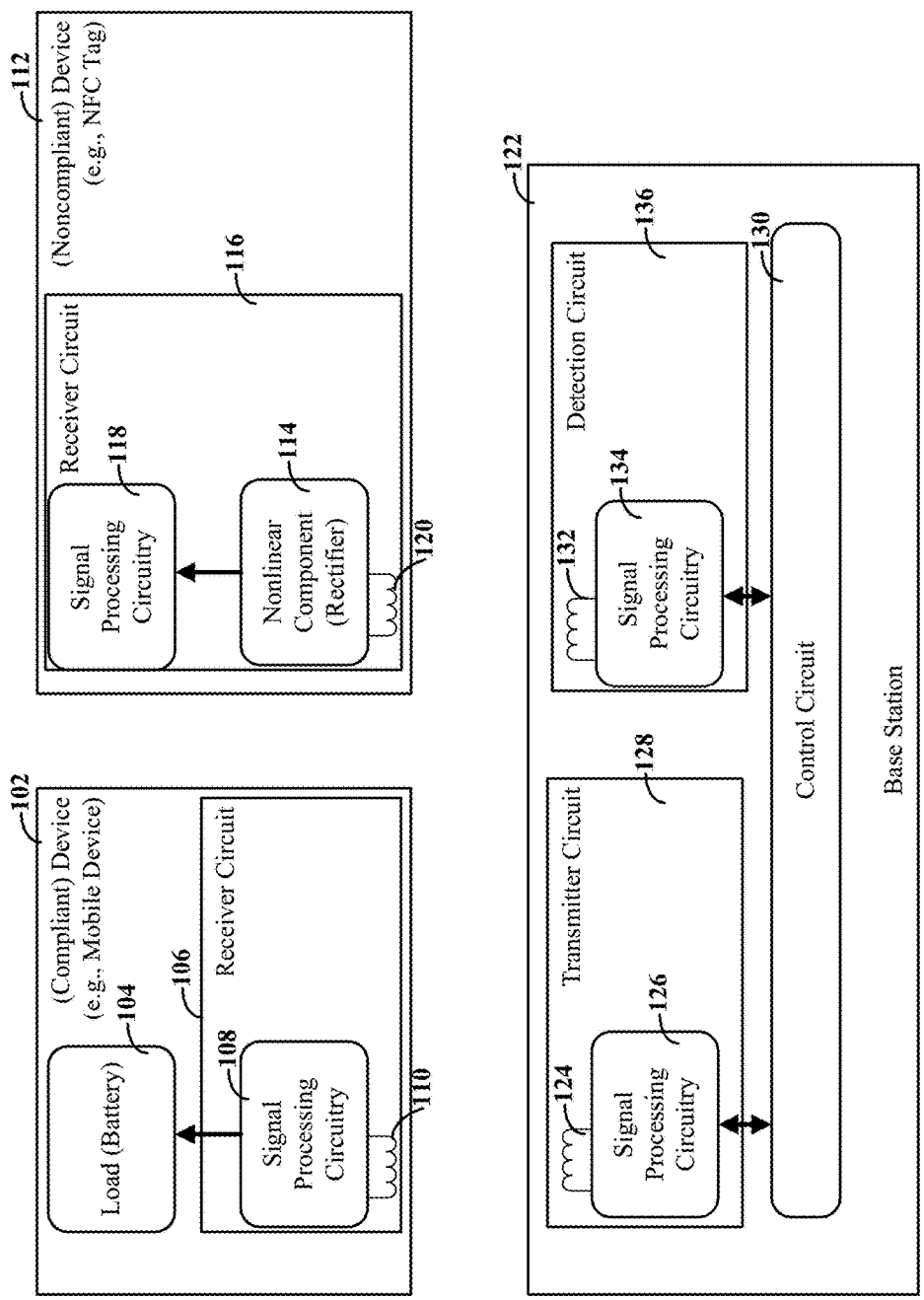
FIG. 1 depicts a block diagram of a system for detecting the presence of a noncompliant device within an RF field, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving the detection of remote devices by detecting a harmonic of a transmitted polling signal. In some embodiments, a harmonic of the RF field is monitored in order to determine when a non-compliant device has coupled to an RF field generated by the device. In certain implementations, aspects of the present disclosure have been shown to be beneficial when used in the context of detecting devices that might otherwise be damaged by a wireless radio frequency (RF) electromagnetic field used for wireless power transfer. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Embodiments of the present disclosure are directed toward a device that includes a communication circuit that generates an RF polling signal, while monitoring for a harmonic of the RF polling signal. The device can use the absence of the harmonic to determine that another communication device is not actively coupled to the RF polling signal. The device can then use the harmonic detection for various different purposes. For instance, the RF polling signal can be used to detect the presence of a device that might cause problems related to another RF signal generated by the device (e.g., an RF signal used to wirelessly provide power). The RF polling signal might be used as an initial check during a communication initiation protocol. This might, for example, help to reduce the ON time of the initiation protocol when no remote device is present. It is also recognized that the detection of a harmonic does not rely upon specific knowledge of the detected device's properties or protocols. Thus, devices from unknown origins and with various different communication protocols may be accurately and quickly detected.

Various embodiments are directed toward a wireless-power-providing (WPP) circuit that is configured to provide wireless power (e.g., as part of a base station) while also monitoring for devices that are not compliant with the provided wireless power. The WPP circuit operates in a wireless-power-providing mode where an RF power signal is generated for coupling to a remote device that draws power from the RF power signal (e.g., as might be used for battery charging). The WPP circuit also generates an RF (polling) signal that is used to poll for non-compliant devices. The WPP circuit can quickly detect a non-compliant device by monitoring for harmonics of the polling signal. The WPP circuit can respond to a detected harmonic by entering a protection mode where the RF power signal is reduced in strength, whether the reduction is to zero or just to a safer power level.

Consistent with various embodiments of the present disclosure, the use of an RF polling signal with harmonic detection can provide a fast detection mechanism. The fast detection can be useful for one or both of reducing power drawn by the detection procedure, or reducing the amount of time that another RF signal is interrupted while the polling/detection is carried out.

Particular embodiments are directed toward the use of a device that functions as a contactless card reader device. For example, NFC products can be configured to function as contactless card reader devices. The reader device can be configured with a harmonic detection (receiver) circuit that monitors for a harmonic of the NFC RF signal frequency. The reader device can be configured to determine that a contactless card is not present when the harmonic is not present or detected. Aspects of the present disclosure relate to the recognition that the harmonics produced by a contactless card are detectable a relatively small time after the RF polling signal is generated. The harmonic detection capability can be particularly useful for providing a fast device detection procedure, which can reduced power drawn during the polling.

For example, a response signal from the contactless card might be used in the detection. The contactless card first receives the RF polling signal. The contactless card may need to verify the RF polling signal before it generates and transmits an appropriate response. The contactless card reader device then receives, decodes, and validates the response. Harmonics generated by non-linear components of the contactless card do not require that the contactless card actively demodulate or respond to the received or transmitted signal. The harmonics are present almost immediately after the contactless card is coupled to the RF polling signal, which helps hasten the detection process.

In a particular example, the detection is based on a third harmonic (H3) that is generated by a card being powered by the RF polling signal/field. A dedicated H3 receiver uses an antenna, H3 (e.g., 40.68 MHz) matching circuitry and an RF peak detector to detect the presence of the H3 frequency components. Consistent with various embodiments, the H3 frequency components are present, on the reader side (also referred to as a base station), in sufficient signal strength after only a few µs. The reader device can be configured to halt the polling procedure after a relative short detection window, whether or not the H3 frequency components are not detected. This can allow for a significant reduction in the transmitter "ON" duration, relative to waiting for a data communication to be received from the card, and a corresponding reduction in the power consumption.

Particular embodiments of the present disclosure are directed toward a device that functions as an NFC controller that generates an RF polling signal at around 13.56 MHz, per the ISO/IEC 18000-3 specification. Some embodiments are also directed toward a device that functions as a wireless power-providing device (e.g., a device configured for compliance with the Alliance for Wireless Power (A4WP) wireless standard). For simplicity, some aspects of the present disclosure refer to aspects, such as frequency and communication protocols, that are consistent with one or both of the NFC and A4WP standards. It is understood that various embodiments are not necessarily limited to a specific protocol(s).

Turning now to the figures, FIG. 1 depicts a block diagram of a system for detecting the presence of a device within an RF field, consistent with embodiments of the present disclosure. In certain embodiments, base station 122 operates as a WPP circuit that includes a transmitter circuit 128 and a detection circuit 136. For simplicity, the base station is discussed in connection with embodiments relating to wireless power (e.g., as specified in the A4WP standard). These embodiments are not meant to be limiting. For example, the detection of harmonics from an RF polling signal can be used in connection with a read and tag irrespective of the presence of separate wireless power capabilities.

The transmitter circuit 128 is shown as including signal processing circuitry 126 and an antenna 124, which are configured to transmit an RF polling signal. In certain embodiments, the RF polling signal can be at, or near, a frequency used by a device 112 that is to be detected by the base station. For instance, the device 112 can include a receiver circuit 116 that includes signal processing circuitry 118, and an antenna 120 that are configured for use with NFC protocols at around 13.56 MHz. The transmitter circuit 128 can transmit a polling signal at about 13.56 MHz. The precise frequency for the RF polling signal is not necessarily limited by strict compliance with the NFC, or other, protocol. Rather, the frequency can be set to a value that is close enough to center frequency of the receiver circuit 116 to allow sufficient coupling by the device 112. The coupling is sufficiently strong when a harmonic is created that can be detected by the detection circuit 136 of the base station 122. Other properties of the RF polling signal (e.g., signal strength) might also be outside of strict compliance with the relevant protocol.

Consistent with some embodiments, the transmitter circuit 128 can be configured to provide wireless power to devices that are compliant with the base station. For example, the transmitter circuit 128 and a compliant device 102 can both be configured to use the A4WP or Qi standards for wirelessly transferring power (e.g., using an RF carrier signal having a frequency of about 6.78 MHz to transfer power). The compliant device 102 is depicted as including a receiver circuit 106, which includes an antenna 110 and signal processing circuitry 108. The antenna 110 and the signal processing circuitry 108 can be tuned to the appropriate frequency to improve coupling with the base station. Received power can be used to power a load 104. In particular examples, the load 104 can include one or more rechargeable batteries.

According to embodiments of the present disclosure, the transmitter and receiver circuits are controlled by a control circuit 130, which can include one or more computer processor circuits, logic circuitry, programmable logic, and combinations thereof. In certain embodiments, the transmitter circuit is configured to provide wireless power to compliant devices 102, while also detecting noncompliant devices 112. When in a WPP mode, the transmitter circuit 128 functions as a wireless-power-providing (WPP) circuit that generates an RF power signal at a first frequency. The RF power signal can provide power to a compliant device 102 by inductive coupling. In some embodiments of the present disclosure, the transmitter circuit 128 can also generate an RF polling signal that is at a different frequency from the RF power signal. The transmitter circuit 128, in various embodiments, can use a single coil to generate both frequencies (e.g., by adjusting capacitive values of an LC resonator formed with the coil). In certain embodiments, the transmitter circuit 128 can use two different coils and two different signal generator circuit that are designed for respective frequencies. For instance, the Qi specification allows the use of frequencies that are significantly lower than the RF polling frequency, which can make it difficult of infeasible to use the same coil and output stage for both signals. Embodiments compliant with the Qi specification might therefore benefit from the use of two separate signal generator circuits with respective coils. In either instance, control circuit 130 can be configured to control when the transmitter circuit 128 generates the RF polling signal, which can be used to check (poll) for the presence of a noncompliant device 122.

Consistent with various embodiments of the present disclosure, the detection circuit 136 includes an antenna 132 and signal processing circuit 134 that are configured to receive and process a received signal that is a harmonic of the RF polling signal. The base station can check for the presence of the harmonic signal to determine whether or not there might be a noncompliant device 112 within coupling distance of the base station. The harmonic signal can be generated from a nonlinear component 114 of the noncompliant device 112, such as a diode of a rectifier circuit.

The particular harmonic (e.g., third, or higher.) being detected can be selected based upon the application in question. The detection circuit 136 can include an antenna and signal processing circuitry 134 that are tuned to the selected frequency. For example, the third harmonic of 40.68 MHz can be selected to detect an NFC device designed to operate at 13.56 MHz. The third harmonic can be selected in this case because the presence of an NFC device with a nonlinear component 114 produces a stronger third harmonic than a conductive (e.g., metal) object without a nonlinear component. The conductive object can still produce a detectable third harmonic, so long as the signal level is sufficiently lower than that produced by the nonlinear component 114. The control circuit 130 can set a signal strength threshold that is higher than expected to be generated by a conductive object in order to distinguish between any conductive object and devices 112.

Figure 2:
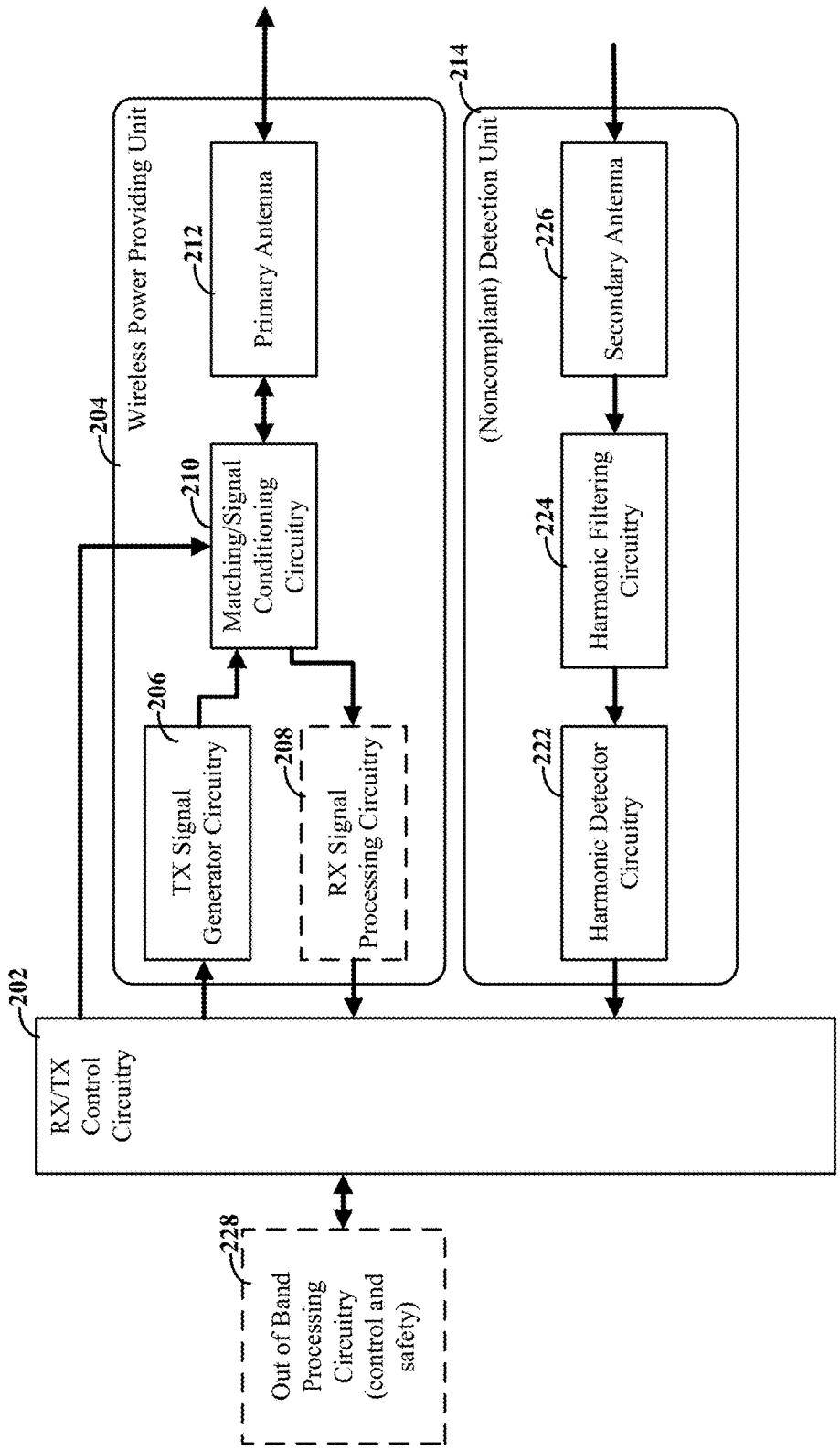
FIG. 2 depicts a block diagram for components and circuits in a base station, consistent with embodiments of the present disclosure.

FIG. 2 depicts a block diagram for components and circuits in a base station, consistent with embodiments of the present disclosure. In certain embodiments, the depicted base station components are consistent with the base station discussed in connection with FIG. 1 and elsewhere. The RX/TX control circuitry 202 can provide control signals that indicate when the WPP unit 204 generates an output signal as well as setting the frequency for the output signal. For example, the base station can enter a WPP mode in which the control circuitry instructs the WPP unit 204 to generate an output signal at a frequency for providing wireless power (e.g., at about 6.78 MHz for A4WP compliance).

In certain embodiments, the control circuitry 202 provides a control signal that sets a corresponding clock frequency that is used by the transmit (TX) signal generator circuitry 206 to generate an output signal. The control circuitry 202 can also provide a control signal that sets the impedance matching/signal conditioning circuitry 210 according to the selected frequency. For example, the matching/signal conditioning circuitry 210 can include one or more capacitors that can be selectively added or removed from the circuit (e.g., via a controllable switch). The capacitance can be adjusted to change the center frequency of the LC circuit formed with the primary antenna 212 with the transmitted frequency. More complex signal processing/conditioning is also possible, such as the use of frequency filters and amplifiers.

In some embodiments, the WPP unit 204 can also receive wireless signals containing data from a remote device using the primary antenna 212. The received signal can be processed by receiver (RX) processing circuitry 208, which can demodulate and decode the data as may be necessary. The WPP unit might also be designed to transmit data as part of an RF WPP signal. For example, the WPP unit could modulate a carrier signal (e.g., using amplitude modulation of a 6.78 MHz carrier signal) with data for a remote device to receive and demodulate. The RX processing circuitry 208 is an optional component that might not be implemented depending on the particular application. For instance, some WPP standards use a secondary communication link to provide data communications (e.g., BlueTooth Low Energy as specified by the A4WP). In some instances, the RX processing circuitry can be simplified so that impedance measurements can be taken (e.g., to detect phone/device placement).

According to various embodiments, the control circuitry 202 can be configured to generate an RF polling signal while in the WPP mode. The control circuitry 202 can provide a control signal to the TX signal generator circuit 206 that causes the TX signal generator circuit to output the RF polling signal (e.g., a 13.56 MHz signal for detecting NFC compliant devices). The result is that the RF WPP signal is halted and the RF polling signal is provided. The control circuitry 202 can also provide a control signal that reconfigures the matching/signal conditioning circuitry 210 for the frequency of the RF polling signal. For instance, the matching/signal conditioning circuitry 210 can provide a capacitance that forms an LC circuit with the inductance of the primary antenna 212. The capacitance value can be modified so that the center frequency of the LC circuit matches, or more closely aligns with, the RF polling signal frequency. In some embodiments, the matching/signal conditioning circuitry 210 includes circuitry for suppressing harmonics of the RF polling signal. For example, a notch filter could be used to suppress the third harmonic when the third harmonic is being used by the detection unit 214.

According to embodiments, detection unit 214 receives a signal on a secondary antenna 226. Consistent with embodiments of the present disclosure, the secondary antenna 226 can be designed for use with the harmonic filter circuitry 224 to receive an RF harmonic signal that is a harmonic of the RF polling signal (e.g., 40.68 MHz for the third harmonic of a 13.56 MHz signal). The harmonic filter circuitry 224 can include, for example, a bandpass filter centered at or near the harmonic frequency. Harmonic detector circuitry 222 is configured to detect the presence of the harmonic in the received signal. Consistent with certain embodiments, harmonic detector circuitry 222 can use a signal strength threshold to determine whether or not there is sufficient harmonic to indicate the potential presence of a nonlinear element of a remote device. For example, the harmonic detector circuitry 222 could use a peak detector or a Fourier analysis to determine the amount of energy within a frequency bin that includes the third harmonic. The determined energy amount can then be compared to a lower threshold. If the energy amount is below the lower threshold, then no device is detected. If the energy amount is above the threshold, then a nonlinear element has been detected.

In various embodiments of the present disclosure, Certain NFC compliant devices, such as contactless cards, can couple to WPP signals at A4WP compliant signal frequencies, despite the difference in tuned frequencies (e.g., 13.56 MHz vs. 6.78 MHz). It has been discovered that, in some instances, the coupling is sufficient to cause physical damage to the NFC compliant devices. To provide protection from such damage, the control circuitry 202 responds to a detection by the harmonic detector circuitry 222 by reducing the power of the RF WPP signal. In some instances, the reduction could be a complete reduction in power by stopping the RF WPP signal (e.g., possibly exiting the WPP mode completely). In other instances, the reduction could be to a safe level that still allows some power to be provided while preventing damage to the NFC compliant device. The control circuit 202 can continue to poll for the presence of the NFC compliant device. Upon determining that the NFC compliant device is no longer present, the power of the WPP signal can be restored (assuming that a remote WPP compliant device is still within range).

According to various embodiments of the present disclosure, out of band processing circuitry 228 can control the operation of the RX/TX control circuitry 202. For instance, processing circuitry 228 can include one or more microprocessor circuits that are configured to respond to the detection of an NFC compliant device by instructing the control circuitry 202 to disable the RF WPP signal generation. Processing circuitry 228 can also include one or more timers that are used to generate polling events to trigger the generation of the RF polling signal.

Figure 3:
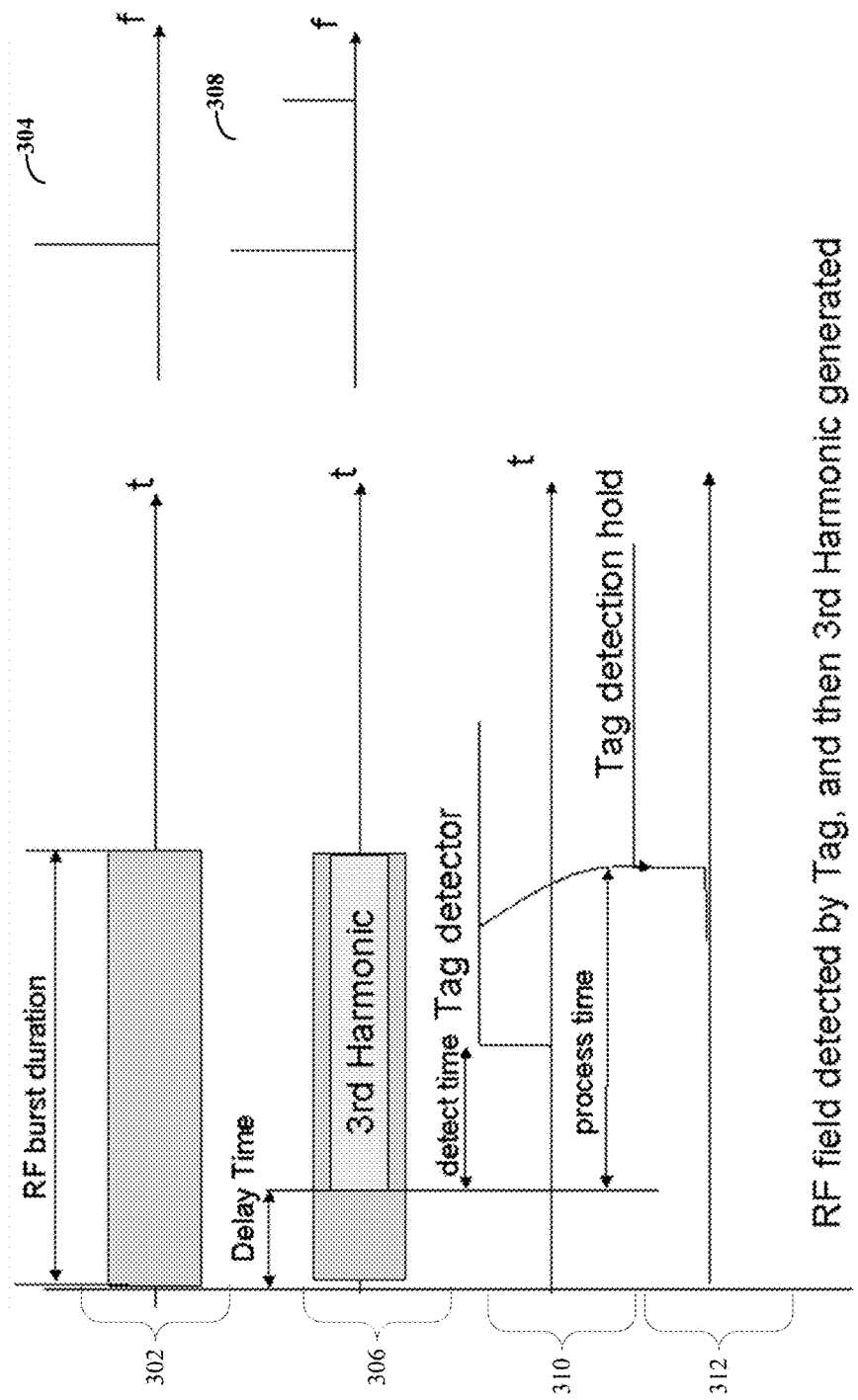
FIG. 3 is signal timing diagrams for RF polling signals and resulting harmonics, consistent with embodiments of the present disclosure.

FIG. 3 is signal timing diagrams for RF polling signals and resulting harmonics, consistent with embodiments of the present disclosure. Signal timing diagram 302 shows an RF polling signal burst having a particular burst duration. As shown in frequency plot 304, there is no third harmonic component in this signal. This would be indicative of a situation where no RF device is present and therefore there is no nonlinear element coupled to the RF polling signal. The length of the RF polling signal burst can be set according to the timing requirements shown in timing diagrams 306, 310, and 312.

In the timing diagram 306, there is a third harmonic generated, as also shown by the frequency plot 308. The depicted delay time indicates an amount of time before the third harmonic is present in sufficient strength to be detected. This delay time is a function of a number of properties including the flight time of the signal and delays based upon the properties of the circuit containing the nonlinear element. For example, the third harmonic might be generated after a tag responds to detecting the presence of an RF field and begins to draw power from the RF field.

The timing diagram 310 shows a detect time (or setup time), which represents a time that the harmonic is present before the harmonic detector circuitry is able to accurately detect the harmonic. For example, the harmonic detector circuitry can include a filter circuit that filter out frequencies other than the third harmonic. A peak detector circuit can then determine whether the filtered signal exceeds a threshold value. The peak detector circuit can have a detection delay time from when the third harmonic is present to when it is detected. When operating in the analog realm, the delay can be the result of the RC constant of the peak detection circuit and is sometimes referred to as the "attack time" of the peak detector circuit. The use of analog filter circuits and peak detectors can be particularly useful for providing a fast and reliable detection. Embodiments of the present disclosure are not necessarily so limited. For example, a received signal can be sampled during a sample time window and a Fourier analysis can then be used to determine how much energy is present in the harmonic frequency. In these examples, the size of the time window and the subsequent processing time would represent the detect time. The process time shown in timing diagram 312 can represent the detection time plus a delay (deglitching) time that helps to prevent triggering from spurious frequency detection events. The tag detection hold represents the WPP base station taking protective measures in response to the detection of a tag (e.g., by halting or reducing the strength of the RF WPP signal).

As discussed herein, the length of the RF burst can be relevant to power draw as well as to preventing undesired effects on a WPP (or similar) RF signal and WPP communication protocol. For instance, the RF burst may interrupt another RF signal for a protocol that has a maximum time that the RF signal can be interrupted before the protocol is violated. The protocol may require that devices tolerate an amount of time that power provided by the RF signal is absent. The amount of time might be expressed as a percentage of a time during a particular time window, for example. The RF burst length can be kept small enough that it does not violate the protocol. In addition to violations of the protocol, the RF burst length can be reduced further in order to mitigate power loss that occurs when the RF WPP signal is interrupted by the RF burst. Moreover, a smaller RF burst length may allow for more frequent interruptions, such as where the protocol uses a percentage-based limitation on interruptions.

Figure 4:
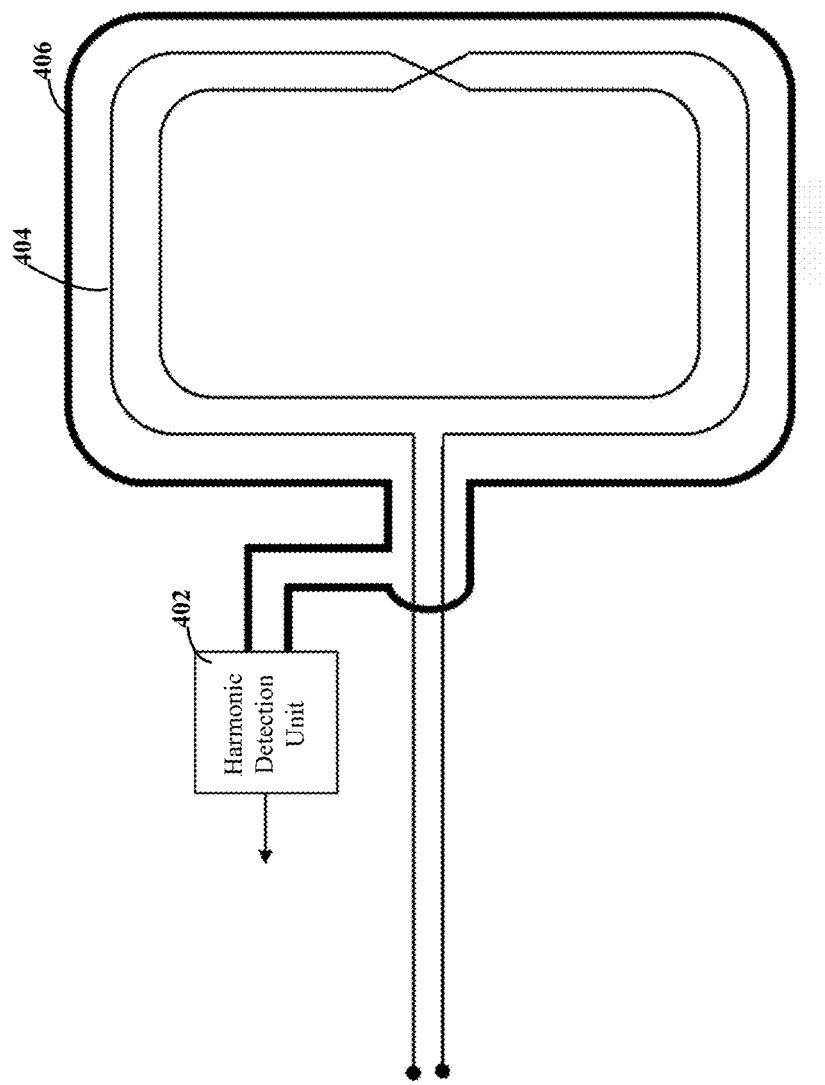
FIG. 4 depicts antenna layouts, consistent with embodiments of the present disclosure.

FIG. 4 depicts antenna layouts, consistent with embodiments of the present disclosure. FIG. 4 shows two antennas 404 and 406. Antenna 404 shows an example of a primary antenna, which can be consistent with the primary antennae discussed herein and in connection with other figures. The primary antenna 404 can be used to transmit the RF polling signal and also the RF WPP signal, as discussed herein. Antenna 406 shows an example layout for a secondary antenna 406. The secondary antenna 406 can be used to detect a harmonic, and can be consistent with the secondary antenna discussed herein and in connection with other figures. For example, a secondary antenna can be connected to a peak detector circuit 402 that is configured to detect a signal peak value for received signals at the harmonic frequency (e.g., 40.68 MHz).

According to certain embodiments, the primary antenna 404 and its TX circuitry is designed to suppress the harmonic in the transmitted signal (e.g., using frequency filtering). The presence of the harmonic on the secondary antenna 406 can therefore be primarily due to external influence on the transmitted signal (due to a coupled external device). One manner in which harmonics can be reduced is to use an output stage that is symmetric relative to the generation of the different signals. The symmetry can be provided relative to the same primary antenna 404 and but with driver circuits having different (capacitive) tunings to match the relative frequency of each signal type.

Figure 5:
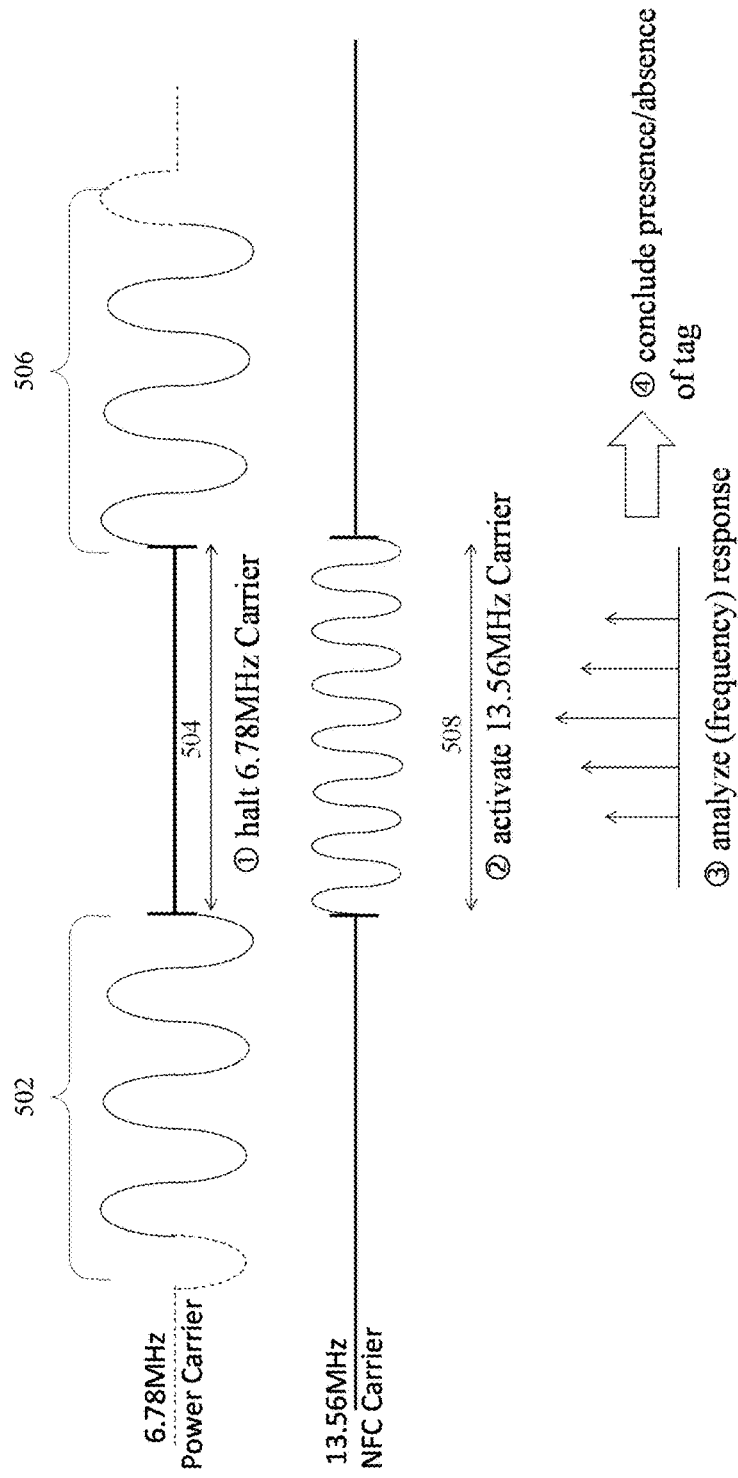
FIG. 5 includes signal timing diagrams that show relative outputs of TX circuitry, consistent with embodiments of the present disclosure.

FIG. 5 includes signal timing diagrams that show relative outputs of TX circuitry, consistent with embodiments of the present disclosure. The timing diagrams of FIG. 5 correspond to the output of a WPP base station that is configured to provide power using a 6.78 MHz carrier signal and to detect the presence of WPP noncompliant devices that are configured to operate at 13.56 MHz (e.g. NFC tag devices). The WPP base station, while in a WPP mode, can output the WPP carrier signal, as shown by 502 and 506. While in the WPP mode, the WPP base station may poll for a WPP noncompliant device by first halting the WPP carrier signal, as shown by 504.

The WPP base station can then activate an RF polling/carrier signal for detecting the WPP noncompliant device, as shown by 508. The depicted example is for a NFC tag detection using a 13.56 MHz carrier signal. The WPP base station can then use detection circuitry to analyze the frequency response and determine (conclude) the presence or absence of a WPP noncompliant device (e.g., NFC a tag device).

It is noted that the signal amplitudes depicted in FIG. 5 are not drawn to relative scale. Generally speaking, the WPP carrier signal would have a significantly greater amplitude than the RF polling signal so that sufficient power can be provided to compliant devices. The RF polling signal can be maintained at a relative lower signal strength so as not to damage devices that are in communication range.

Figure 6:
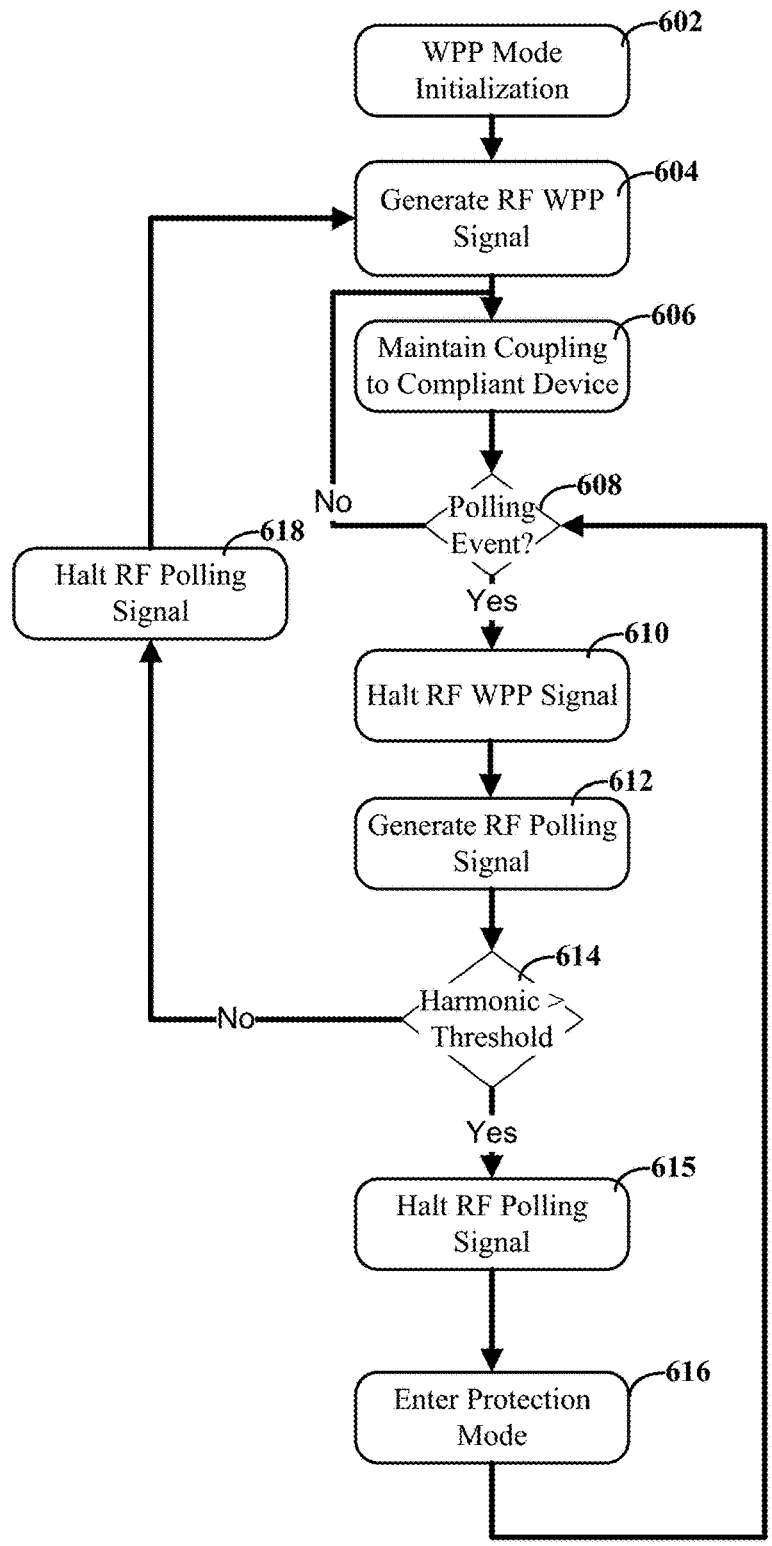
FIG. 6 is a flow diagram for use with a WPP base station, consistent with embodiments of the present disclosure.

FIG. 6 is a flow diagram for use with a WPP base station, consistent with embodiments of the present disclosure. The flow diagram beings with the WPP base station initiating, or entering, a WPP mode, per block 602. The WPP mode might be entered, for example, upon detecting the presence of a WPP compliant device. The particular detection procedure can vary according to the WPP protocol being used. While in the WPP mode, the WPP base station generates an RF WPP signal, per block 604. The RF WPP signal is transmitted using a primary antenna that generates an RF field. The WPP-compliant device receives wireless power through inductively coupling to the transmitter circuit using the RF WPP signal and field, per block 606.

The WPP base station can maintain the RF WPP signal, at its corresponding frequency, until a polling event occurs, as indicated by block 608. A polling event might be a periodic event that reoccurs at set time intervals. For example, a periodic timer can be set to create the polling events. A polling event might also be driven by other factors that might indicate the presence of a WPP-noncompliant device, but still benefit from using H3 detection. For example, a change in the RF WPP field strength might indicate a conductive object has entered the RF field (e.g., as might be determined by measuring the impedance on the primary antenna). A corresponding polling event would begin the process of determining whether the change is due to a WPP-noncompliant device or some other conductive object.

If a polling event occurs, the WPP base station can halt the RF WPP signal generation, per block 610. For example, the WPP base station can send a control signal to transmitter circuitry that indicates that the WPP signal be halted. The WPP base station can also begin to generate, using the transmitter circuit, an RF polling signal that is another frequency (e.g., 13.56 MHz), per block 612. The WPP base station can use a control signal for this purpose, whether the control signal is the same control signal (for simultaneous transition between frequencies) or two different control signals (allowing independent control over start and stop times for each frequency).

The WPP base station can then detect a WPP noncompliant device by determining, using a detection circuit, whether or not a harmonic of the RF polling signal is present in sufficient strength, per block 614. For example, the WPP base station can determine a peak amplitude or amount of signal energy at the harmonic frequency. The determined value can then be compared to a threshold value to detect the presence of a non-compliant wireless device. If no WPP-noncompliant device is detected, the WPP base station can halt the RF polling signal, per block 618, and restart the RF WPP power signal, per block 604. The halting and restarting can be accomplished using the previously discussed control signals.

If a WPP-noncompliant device is detected (Harmonic>Threshold), the control circuit can halt the RF polling signal, per block 615. The WPP base station can then enter a protection mode, per block 616. In the protection mode, the control circuit can reduce the signal strength for the RF WPP signal. In some instances, the RF WPP signal strength can be reduced to zero by completely halting the signal. In other embodiments, the signal strength can be reduced to a value that is safe for the WPP-noncompliant device. Reducing in this regard may allow for wireless power to still be provided, although the amount of wireless power that is available may be reduced.

In certain embodiments, the WPP base station can continue to monitor for the presence of a WPP-noncompliant device. This can allow the WPP base station to restore the signal strength of the RF WPP signal if the WPP-noncompliant device is moved out of range of the RF field from the WPP base station. In such embodiments, the WPP base station can continue to check for polling events, per block 608.

Figure 7:
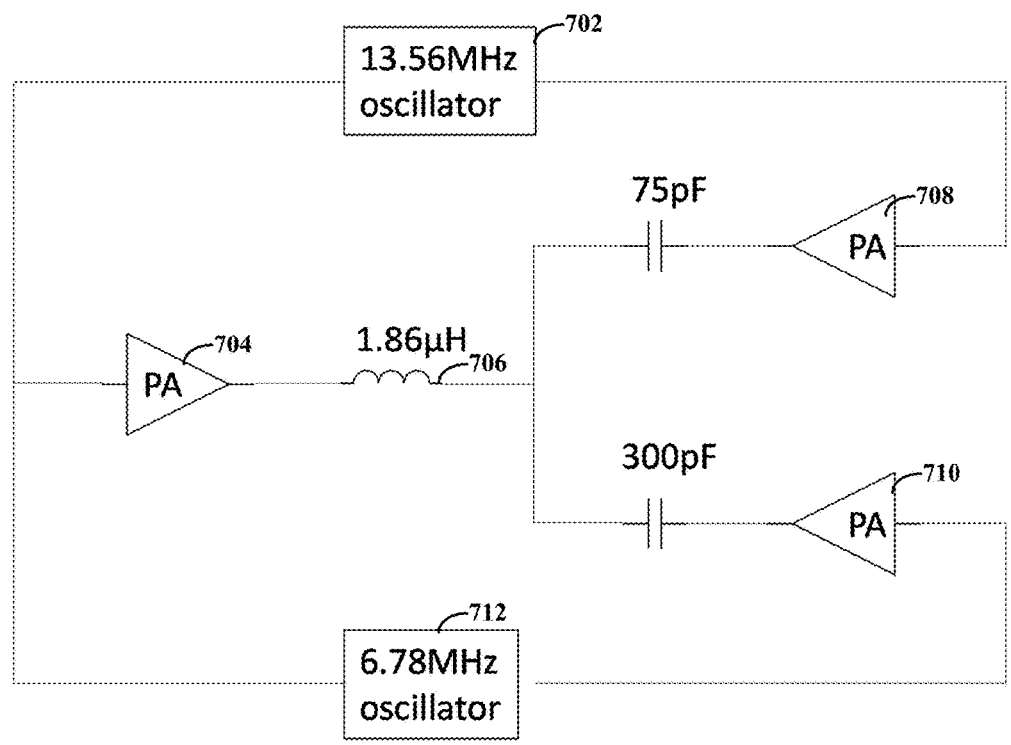
FIG. 7 depicts a circuit diagram for a power transmitter with a symmetric output stage, consistent with embodiments of the present disclosure.

FIG. 7 depicts a circuit diagram for a power transmitter with a symmetric output stage, consistent with embodiments of the present disclosure. Various embodiments are directed toward the reduction of harmonics injected by the WPP base station when generating the RF polling signal, particularly harmonics at the same frequency being used by the WPP base station to detect a non-compliant device. The injection of such harmonics can reduce the accuracy of the detection capabilities and lead to a failure to detect devices or in false positive detections. One manner in which harmonics can be reduced is to use an output stage that is symmetric relative to the generation of the different signals.

The output stage of FIG. 7 is depicted as including two oscillator circuits 702, 712. The first oscillator circuit 702 is designed to operate at the RF polling frequency (e.g., 13.56 MHz) and the second oscillator circuit 712 is configured to operate at the RF WPP frequency. Power amplifier 704 is used in the generation of both output signals. Power amplifier 708 and 710 are used for the generation of an RF polling signal and RF WPP signal, respectively. Each of power amplifiers 708 and 710 are coupled to the inductive antenna 706 through respective impedance elements, which are depicted as capacitors. The impedance (capacitive) values are shown as being different for each of the power amplifiers. This allows for the impedance value of the output stage to be switch according to the desired signal frequency so that the resulting LC circuit is properly tuned. The control circuit can activate the respective leg by activating and deactivation the corresponding power amplifier 708 or 710, while power amplifier 704 is activated in each instance.

It is recognized that large differences between the RF polling frequency and the RF WPP signal can make it difficult or infeasible to properly implement a symmetric output stage in the depicted manner. For such instances, other solutions are possible, such as the use of two different output coils connected to respective and different output stages.

Terms to specify orientation, such as upper/lower, left/right, top/bottom and above/below, may be used herein to refer to relative positions of elements as shown in the figures. It should be understood that when the terminology is used for notational convenience, the actual use of the disclosed structures may involve orientations that are different from the orientations shown in the figures.

For the purposes of this document, the following terms and definitions apply: a harmonic of a fundamental frequency is an integer multiple of the fundamental frequency; polling includes repeated checks on the status of an external device The Specification describes and/or illustrates aspects useful for implementing the disclosed and claimed embodiments by way of various circuits or circuitry. The circuitry may be discussed using terms such as blocks, modules, device, system, unit, controller, and/or other terms. For example, in certain of the above-discussed embodiments, one or more items discussed in this context represent circuits (e.g., discrete logic circuitry or (semi-) programmable circuits) configured and arranged for implementing disclosed operations/activities, as may be carried out in the approaches shown in the figures. In certain embodiments, such items represent computer circuitry, which is understood to include a processor circuit (e.g., central processing unit (CPU) or microcontroller) connected to a memory circuitry that stores code (program to be executed as a set/sets of instructions) for performing the related steps, functions, operations, activities, etc. The specification may also make reference to an adjective that does not connote any attribute of the structure ("first [type of structure]" and "second [type of structure]") in which case the adjective is merely used for English-language antecedence to differentiate one such similarly-named structure from another similarly-named structure (e.g., "first circuit configured to convert . . . " is interpreted as "circuit configured to convert . . . ").

Embodiments may include features recited in the following numbered clauses.

1. An apparatus comprising: a wireless-power-providing (WPP) circuit configured to provide wireless power to a WPP-compliant wireless device, the wireless-power-providing circuit including: a transmitter circuit configured to: generate, in a wireless-power-providing mode, a first radio frequency (RF) signal at a first frequency, the first RF signal inductively coupling the transmitter circuit to the compliant wireless device; and generate a second RF signal at a second frequency; a detection circuit configured to detect the presence of a WPP-noncompliant wireless device, the detection circuit including: a receiver circuit configured to detect a third RF signal at a third frequency that is a harmonic of the second frequency; and a control circuit configured to: control, for the wireless-power-providing mode, the generation each of the first RF signal and the second RF signal by the transmitter circuit; and reduce, in response to detecting the third RF signal, a signal strength for the first RF signal.

2. The apparatus of clause 1, wherein the wireless-power-providing circuit further includes a wireless-power-providing receiver circuit configured to receive communications from the compliant wireless device and at the first frequency.

3. The apparatus of clause 1 or 2, wherein the transmitter circuit includes impedance matching circuitry configured to provide impedance matching to an antenna at each of the first and second frequencies by adjusting an impedance element value of the impedance matching circuitry.

4. The apparatus of any of clauses 1 to 3, wherein the control circuit is configured to periodically stop the transmitter circuit from generating the first RF signal while generating the second RF signal during the wireless-power-providing mode.

5. The apparatus of any of clauses 1 to 4, wherein the control circuit is further configured to cause the transmitter circuit to generate the second RF signal for a burst having a duration that is set based upon a setup time for generation of the third RF signal by the noncompliant wireless device and a hold time for the detection circuit to detect the third RF signal.

6. The apparatus of any of clauses 1 to 5, wherein the second frequency is about 13.56 MHz and the third frequency is about 40.68 MHz.

7. The apparatus of any of clauses 1 to 6, wherein the control circuit is configured to reduce the signal strength for the first RF signal by disabling the transmitter circuit in response to detecting a noncompliant device.

8. The apparatus of any of clauses 1 to 7, wherein the WPP circuit is configured to detect a WPP-compliant wireless device be detecting a change in impedance at the transmitter circuit.

9. The apparatus of any of clauses 1 to 8, wherein the control circuit is configured to use one or more control signals to control the generation each of the first RF signal and the second RF signal by the transmitter circuit.

10. A method comprising: providing wireless power to a wireless-power-providing (WPP)-compliant wireless device by, in a WPP mode: generating, using a transmitter circuit, a first radio frequency (RF) signal at a first frequency; and inductively coupling the transmitter circuit to the compliant wireless device using the first RF signal; generating, using the transmitter circuit, a second RF signal at a second frequency; detecting, using a detection circuit, the presence of a WPP-noncompliant wireless device by detecting a third RF signal at a third frequency that is a harmonic of the second frequency; and protecting, using a control circuit, the noncompliant wireless device by reducing, in response to detecting the third RF signal, a signal strength for the first RF signal.

11. The method of clause 10, wherein the noncompliant wireless device includes a nonlinear component that produces the third RF signal by backscattering of the second RF signal.

12. The method of clause 10 or 11, wherein the non-compliant wireless device is a near-field-communication (NFC) device and the transmitter circuit is an Alliance for Wireless Power compliant device.

13. The method of any of clauses 10 to 12, further comprising periodically polling for the presence of a non-compliant wireless device in response to providing wireless power to a compliant wireless device.

14. The method of clause 13, wherein the generating the second RF signal includes generating RF bursts having a duration that is set based upon a setup time for generation of the third RF signal by the non-compliant wireless device and a hold time for detecting the third RF signal 15. The method of any of clauses 10 to 14, further comprising detecting the absence of a non-compliant wireless device by detecting the absence of the third RF signal.

16. The method of clause 15, further comprising increasing, in response to detecting the absence, the signal strength for the first RF signal.

17. The method of any of clauses 10 to 16, further comprising detecting a WPP-compliant wireless device be detecting a change in impedance at the transmitter circuit.

18. The method of any of clauses 10 to 17, further comprising using one or more control signals to control the generation each of the first RF signal and the second RF signal by the transmitter circuit.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the device detection using harmonics can be used in contexts other than WPP. As another example, the various embodiments can be applied to protocols and frequencies other than those expressly disclosed herein. Such modifications do not depart from the true spirit and scope of various aspects of the disclosure, including aspects set forth in the claims.

The invention claimed is:

1. An apparatus comprising:
a wireless-power-providing (WPP) circuit configured to provide wireless power to a WPP-compliant wireless device, the wireless-power-providing circuit including:
a transmitter circuit configured to:
generate, in a wireless-power-providing mode, a first radio frequency (RF) signal at a first frequency, the first RF signal inductively coupling the transmitter circuit to the compliant wireless device; and
generate a second RF signal at a second frequency;
a detection circuit configured to detect a presence of a WPP-noncompliant wireless device, the detection circuit including:
a receiver circuit configured to detect a third RF signal at a third frequency that is a harmonic of the second frequency; and
a control circuit configured to:
control, for the wireless-power-providing mode, the generation each of the first RF signal and the second RF signal by the transmitter circuit; and
reduce, in response to detecting the third RF signal, a signal strength for the first RF signal;
wherein the control circuit is further configured to cause the transmitter circuit to generate the second RF signal for a burst having a duration that is set based upon a setup time for generation of the third RF signal by the noncompliant wireless device and a hold time for the detection circuit to detect the third RF signal.

2. The apparatus of claim 1, wherein the wireless-power-providing circuit further includes a wireless-power-providing receiver circuit configured to receive communications from the compliant wireless device and at the first frequency.

3. The apparatus of claim 1, wherein the transmitter circuit includes impedance matching circuitry configured to provide impedance matching to an antenna at each of the first and second frequencies by adjusting an impedance element value of the impedance matching circuitry.

4. The apparatus of claim 1, wherein the control circuit is configured to periodically stop the transmitter circuit from generating the first RF signal while generating the second RF signal during the wireless-power-providing mode.

5. The apparatus of claim 1, wherein the second frequency is about 13.56 MHz and the third frequency is about 40.68 MHz.

6. The apparatus of claim 1, wherein the control circuit is configured to reduce the signal strength for the first RF signal by disabling the transmitter circuit in response to detecting the noncompliant device.

7. The apparatus of claim 1, wherein the WPP circuit is configured to detect the WPP-compliant wireless device by detecting a change in impedance at the transmitter circuit.

8. The apparatus of claim 1, wherein the control circuit is configured to use one or more control signals to control the generation each of the first RF signal and the second RF signal by the transmitter circuit.

9. A method comprising:
providing wireless power to a wireless-power-providing (WPP)-compliant wireless device by, in a WPP mode:
generating, using a transmitter circuit, a first radio frequency (RF) signal at a first frequency; and
inductively coupling the transmitter circuit to the compliant wireless device using the first RF signal;
generating, using the transmitter circuit, a second RF signal at a second frequency;
detecting, using a detection circuit, a presence of a WPP-noncompliant wireless device by detecting a third RF signal at a third frequency that is a harmonic of the second frequency; and protecting, using a control circuit, the noncompliant wireless device by reducing, in response to detecting the third RF signal, a signal strength for the first RF signal;
further comprising periodically polling for the presence of the non-compliant wireless device in response to providing wireless power to the compliant wireless device;
wherein the generating the second RF signal includes generating RF bursts having a duration that is set based upon a setup time for generation of the third RF signal by the non-compliant wireless device and a hold time for detecting the third RF signal.

10. The method of claim 9,
wherein the noncompliant wireless device includes a nonlinear component that produces the third RF signal by backscattering of the second RF signal.

11. The method of claim 9,
wherein the non-compliant wireless device is a near-field-communication (NFC) device and the transmitter circuit is an Alliance for Wireless Power compliant device.

12. The method of claim 9,
further comprising detecting an absence of the non-compliant wireless device by detecting an absence of the third RF signal.

13. The method of claim 12,
further comprising increasing, in response to detecting the absence of the third RF signal, the signal strength for the first RF signal.

14. The method of claim 9,
further comprising detecting the WPP-compliant wireless device by detecting a change in impedance at the transmitter circuit.

15. The method of claim 9,
further comprising using one or more control signals to control the generation each of the first RF signal and the second RF signal by the transmitter circuit.

16. An apparatus comprising:
a wireless-power-providing (WPP) circuit configured to provide wireless power to a WPP-compliant wireless device, the wireless-power-providing circuit including:
a transmitter circuit configured to:
generate, in a wireless-power-providing mode, a first radio frequency (RF) signal at a first frequency, the first RF signal inductively coupling the transmitter circuit to the compliant wireless device; and
generate a second RF signal at a second frequency;
a detection circuit configured to detect a presence of a WPP-noncompliant wireless device, the detection circuit including:
a receiver circuit configured to detect a third RF signal at a third frequency that is a harmonic of the second frequency; and
a control circuit configured to:
control, for the wireless-power-providing mode, the generation each of the first RF signal and the second RF signal by the transmitter circuit and
reduce, in response to detecting the third RF signal, a signal strength for the first RF signal;
wherein the detection circuit is further configured to detect an absence of the non-compliant wireless device by detecting an absence of the third RF signal; and
wherein the control circuit is further configured to increase, in response to detecting the absence of the third RF signal, the signal strength for the first RF signal.

* * * * *